(12) United States Patent
Couture-Gagnon

(10) Patent No.: US 7,397,474 B2
(45) Date of Patent: Jul. 8, 2008

(54) RESTRICTING SMOOTHING OPERATIONS ON A THREE-DIMENSIONAL GEOMETRICAL PRIMITIVE ACCORDING TO A SURFACE NORMAL

(75) Inventor: Jérôme Couture-Gagnon, Longueuil (CA)

(73) Assignee: Avid Technology, Inc., Tewksbury, MA (US)

( * ) Notice: Subject to any disclaimer, the term of this patent is extended or adjusted under 35 U.S.C. 154(b) by 269 days.

(21) Appl. No.: 10/887,073

(22) Filed: Jul. 8, 2004

(65) Prior Publication Data

US 2005/0027767 A1 Feb. 3, 2005

Related U.S. Application Data

(60) Provisional application No. 60/490,492, filed on Jul. 28, 2003.

(51) Int. Cl.
*G06T 17/00* (2006.01)
(52) U.S. Cl. .................. 345/420; 345/421; 345/611
(58) Field of Classification Search ............. None
See application file for complete search history.

(56) References Cited

U.S. PATENT DOCUMENTS 6,987,511 B2 * 1/2006 Taubin .................. 345/420

OTHER PUBLICATIONS

Wikipedia: http://en.wikipedia.org/wiki/Concave_polygon.*
Bill, James R., "Computer Sculpting of Polygonal Models Using Virtual Tools", Thesis of James R. Bill, University of California Santa Cruz, Jun. 1994, pp. i-73.
Jones, Thouis Raymond, "Feature Preserving Smoothing of 3D Surface Scans", submitted to Dept. Of Electrical Engineering and Computer Science for MS in Computer Science, MIT, Sep. 16, 2003, pp. 1-70.
Jones, Thouis R., et al., "Non-Iterative, Feature -Preserving Mesh Smoothing," Proc. ACM Siggraph, ACM Press, 2003, pp. 943-949.
Klein, Reinhard, et al., "Multiresolution Representations for Surface Meshes", Proceedings of the Spring Conference on Computer Graphics, Jun. 1997, pp. 57-66.
Madi, M.M., et al., "3D Point Location For Special Feature Preservation During Surface Smoothing"<WSCG '99 Conference Proceedings.

(Continued)

*Primary Examiner*—Mark Zimmerman
*Assistant Examiner*—Jwalant Amin
(74) *Attorney, Agent, or Firm*—John A. Hamilton

(57) ABSTRACT

Smoothing operations on a three-dimensional geometrical primitive, such as a mesh, are restricted by filtering the set of smoothing vectors to apply a user-selected restriction to the set of vectors. The user-selected restriction limits the set of smoothing vectors according to a normal of a surface corresponding to the primitive. The filtered set of vectors are applied to the primitive to smooth the primitive. Thus, smoothing may be applied proportionally to the convexity or concavity of the surface. Smoothing also may be applied to move a control point of the primitive, such as a vertex in a mesh, only in a direction parallel to the normal of the surface at that control point or perpendicular to the normal of the surface at that control point. Each control point also may be reprojected after smoothing onto the original surface along the normal of the smoothed surface, or the normal of the original surface.

8 Claims, 2 Drawing Sheets

OTHER PUBLICATIONS

Mokhtarian, F., et al., "Multi-Scale 3-D Free-Form Surface Smoothing", In Proceedings British Machine Vision Conference, pp. 730-739, 1998.

Ohtake, Yutaka, et al., "Polyhedral Surface Smoothing with Simultaneous Mesh Regularization", Geometric Modeling and 24 Processing 2000 Proceedings, pp. 229-237.

Shamir, Ariel, et al., "Multi-Resolution Dynamic Meshes with Arbitrary Deformations", In IEEE Visualization Conference 2000, pp. 423-430.

Sun, Yiyong, et al., "Surface Modeling Using Multi-View Range and Color Images", Integrated Computer-Aided Engineering 10 (2003), pp. 37-50.

Taubin, Gabriel, A Signal Processing Approach to Fair Surface Design:, In Proceedings of SIGGRAPH '95, Aug. 1995, pp. 351-358.

Taubin, Gabriel, "Dual Mesh Resampling", Pacific Graphics 2001, Tokyo Japan, Oct. 2001.

Yagou, Hirokazu, et al., "Mesh Smoothing via Mean and Median Filtering Applied to Face Normals", In Geometric Modeling and Processing 2002 Proceedings, 2002, pp. 124-131.

* cited by examiner

RESTRICTING SMOOTHING OPERATIONS ON A THREE-DIMENSIONAL GEOMETRICAL PRIMITIVE ACCORDING TO A SURFACE NORMAL

CROSS-REFERENCE TO RELATED APPLICATION

This application is a nonprovisional application that claims the benefit of provisional application Ser. No. 60/490,492, filed Jul. 28, 2003, and hereby incorporated by reference.

BACKGROUND

Smoothing is a general operation that can be applied on a three-dimensional geometrical primitive, such as a mesh or NURBS surface, to reduce high-frequency variations of geometric properties, such as positions and colors. In the context of two-dimensional or three-dimensional geometric primitives, smoothing is usually performed by applying a local averaging filter over each vertex and their neighbors. The definition of neighbors may be based on connectivity, spatial proximity or other characteristic. Such smoothing can be applied to achieve animation effects.

For three-dimensional objects, smoothing can be applied on control vertices of a shape in order to enhance it relatively to one of the many esthetic criteria. Such criteria may include low-frequency curvature, locally equilateral segments, and locally equiangular connectivity around a vertex local grid alignment.

Without fine control, smooth operations produce an overwhelming number of mixed effects. Depending on the artistic context, some of these may cause undesirable behaviors, such as failing to preserve either the shape or other properties such as local convexities and concavities.

SUMMARY

The smooth operation may be restricted according to a surface normal of a geometrical primitive to control subdeformations. Additionally, these restrictions can be controlled interactively, requiring only a global input, and may be applied automatically over each smoothed vertex. Different automated restrictions can be combined within the same smooth operation. Such restrictions may include a restriction relative to initial surface position by keeping only the vector projected on the previous position of the geometric primitive. A restriction relative to surface normal direction also may be applied by decomposing a smooth vector into parallel and perpendicular components relative to a surface normal. Finally, a restriction relative to curvature sign (whether concave or convex relative to the surface normal) may be applied.

These restrictions are independent from the implemented smooth method. Also, these restrictions apply to a variety of smooth methods, including those that do not use vertex connectivity in order to define a neighborhood.

Thus, given a three-dimensional geometrical primitive and a smoothing operation, that the smoothing operation can provide a set of vectors describing how each control point in the primitive moves as a result of the smoothing operation. The restrictions filter or otherwise process this set of vectors. The processed or filtered vectors are then applied to the geometrical primitive. The method is independent of the type of smoothing operation performed, so long as the smoothing operation provides an appropriate set of vectors describing the transformation it performs. Different smoothing operations and different restrictions can be applied to different parts of a geometrical primitive.

DETAILED DESCRIPTION

Figure 1:
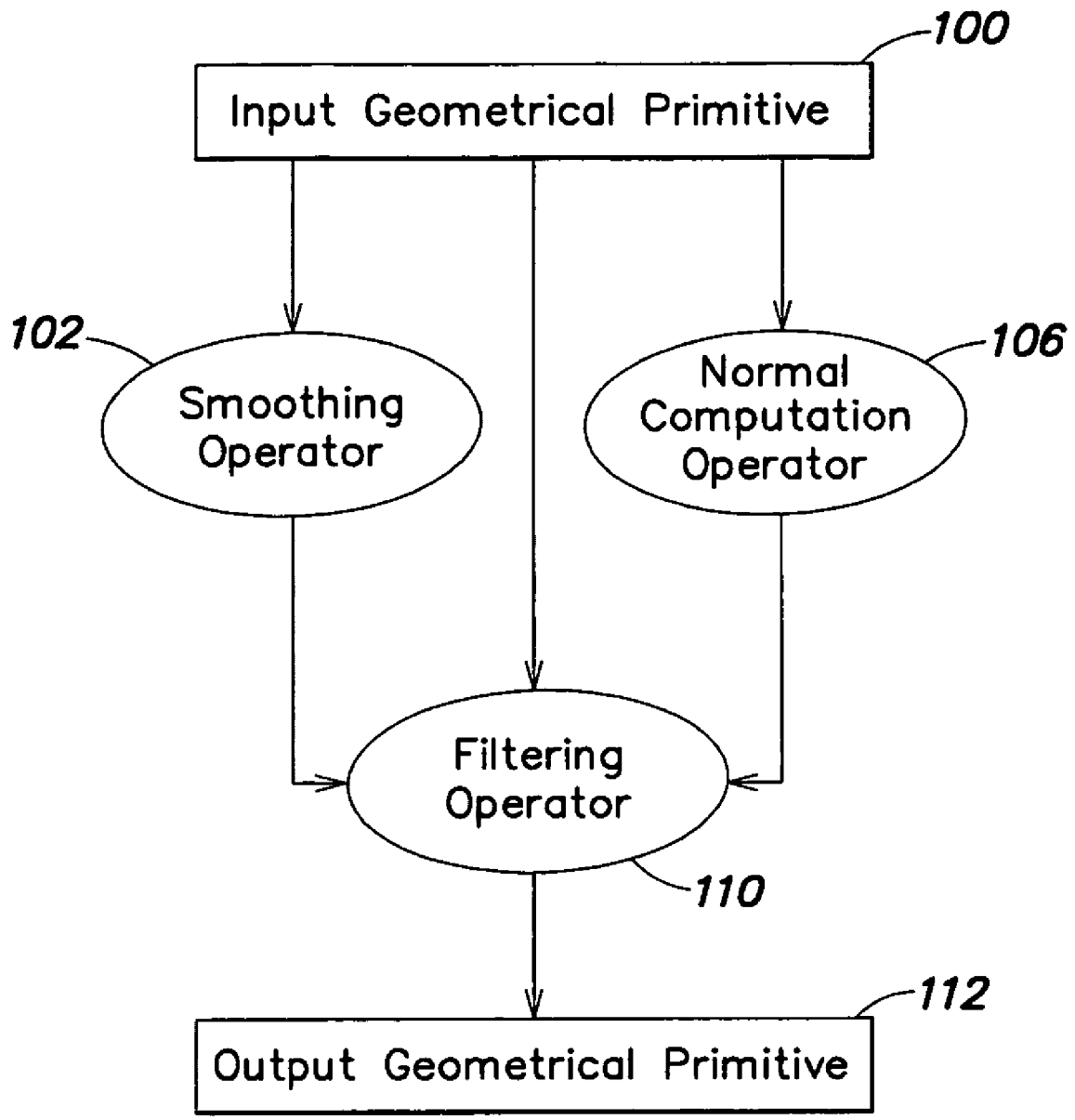
FIG. 1 is a dataflow diagram describing how application of a smoothing operation to a geometrical primitive may be restricted.

A smoothing operation may be applied to three dimensional geometrical primitives, such as a mesh or NURBS surface. A three dimensional geometrical primitive G is generally defined as a set of n control vertices $V=\{V_i: 1<=i<=n\}$, each being associated to a position triplet $P_{Vi}=(x_i, y_i, z_i)$.

An example of a three-dimensional geometrical primitive is a mesh. A mesh is defined by specifying faces, vertices and edges. The vertices and edges define n-sided faces. Typically, a mesh has faces that are mostly, but not necessarily all, quadrilaterals. A mesh generally is defined by three arrays that store the vertices, edges and faces. The data structure representing each vertex may include, for example, data defining its position as well as the indices of the neighboring edges and faces. Each vertex has a valence that is equal to the number of polygons adjacent to the vertex. The data structure representing each edge may include, for example, data defining the indices of its endpoints and the indices of the two adjacent faces. The data structure representing each face may include, for example, data defining the indices of its neighboring faces, edges and vertices.

Smoothing, generally, is an operation that, for each vertex in a geometrical primitive, or in a selected part of the primitive, provides a triplet describing how the vertex is to be moved in each of three dimensions. We can then define for $V_i$ the smooth function S(ndist, weight, Vi) returning the smoothed position triplet $S_{Vi}$, as the normalized sum of weighted neighbor positions:

$$S_{Vi}=S(n\text{dist, weight, }Vi)=(\Sigma_{j=0\text{ to }n}P_{Vj}*\text{weight}(n\text{dist}(V_i, V_j)))/(\Sigma_{j=0\text{ to }n}\text{weight}(n\text{dist}(V_i, V_j))), \text{where:}$$

$P_{Vj}$ is the original, non-smoothed position of vertex j in the original geometrical primitive;

ndist($V_i$, $V_j$) is any function returning the neighborhood distance between two vertices, which can be defined in various ways, including but not limited to spatial distance, connectivity, and path distance; and weight(d) is any function returning a weight based on the distance d. Usually, for faster computation, the returned weight is 0 after some maximum distance.

The smoothing vector of $V_i$ can be defined as the triplet $\Delta V_i = S_{Vi} - P_{Vi}$. Thus, a smoothing operation applied to a subset of vertices K∈V consists of adding to each vertex $V_k$∈K the corresponding smoothing vector $\Delta V_k$.

For every vertex of a mesh M, a new position is computed according to the existing vertex positions using a SmoothVertex function (below). The positions are computed in such a way that the modification of one vertex does not affect the computation of another vertex. This computation can be performed, for example, by storing the newly computed positions in temporary storage. After all the new positions have been computed, the new positions are transferred from temporary storage and assigned to the vertices.

An example smooth operation of a mesh M is as follows. A definition of the neighborhood distance function ndist vertices in a polygonal mesh can be the minimal number of segments between two vertices, also called a topological distance. Consequently, for any vertex v, ndist(v,v)=0, and for any vertex $v_2$ connected to v by a segment, ndist(v,$v_2$)=ndist($v_2$,v)=1. A definition of the weighting function weight can be such that weight(d)=1 if d=0 or d=1, and 0 otherwise. The SmoothVertex operation is can then be defined as:

SmoothVertex(v)
Let $P=P_V$ be the position vector for vertex v.
For each vertex $v_2$ adjacent to v, add their position to P
Return P divided by (number of vertices adjacent to v)+1.
where v is the vertex to be smoothed.

Referring now to FIG. 1, restricted smoothing of an input mesh 100, as an example three-dimensional geometrical primitive, will now be described. The input mesh 100 is input to the smoothing operator 102 which outputs a set of vectors in three dimensions indicating how each vertex will be moved. The mesh also is input to a normal calculation operator 106 which computes a set of vectors normal to the surface at each vertex. The set of smoothing vectors and the set of normal vectors and the input mesh are used by a filtering operator 110, to provide an output mesh 112. The filtering operator limits how the set of smoothing vectors are applied to the input mesh 100, using the mesh and the set of normal vectors.

Figure 2:
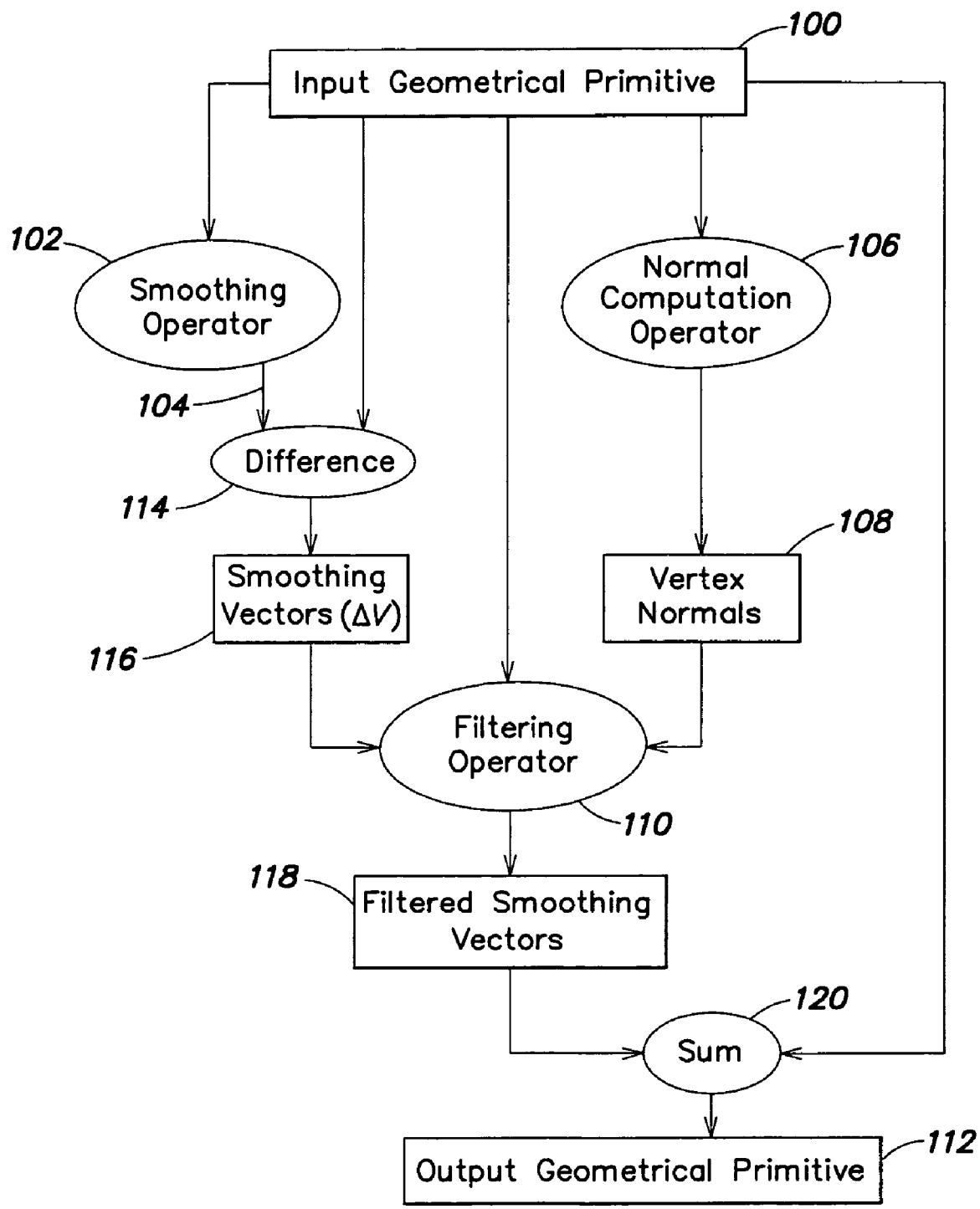
FIG. 2 is a dataflow diagram describing FIG. 1 in more detail.

Referring now to FIG. 2, a more detailed data flow diagram will now be described. The output 104 of the smoothing operator 102 is a mesh. A difference operator 114 compares the output 104 of the smoothing operator with the input mesh 100 to produce a set of smoothing vectors 116. The output 108 of the normal calculation operator 106 is the set of normal vectors. The filter operator 110 uses the set 108 of normal vectors and the set 116 of smoothing vectors to produce filtered smoothing vectors 118. The filtered smoothing vectors 118 are applied to the input mesh 100 by a sum operator 120 to product the output mesh 112.

There are several ways in which the application of the set of smoothing vectors to the input mesh 100 can be restricted by the filtering operator 110. Three examples will now be described.

One form of restriction is to reproject the smoothed geometry on the previous shape. The effect of this restriction is that the shape will not grow or shrink. Instead, the points will slide on the surface. After many iterations, polygons will converge to regular shapes. This restriction therefore is useful in polygon modeling for characters in three-dimensional animation. Each vertex, after the smoothing vectors are applied to move it, is then reprojected on the original surface along the normal of the smoothed surface (or the normal of the original surface). This reprojection can be performed locally.

A method for computing such reprojection will now be described. Vertex v has a neighborhood of n ordered vertices contained in set $A_V = \{a_i: 1 \leq i \leq n\}$, so that $a_{i+1}$ is next to $a_i$, and $a_1$ is next to $a_n$. The geometric primitive usually defines the ordering of the neighborhood; otherwise an arbitrary one can be chosen. Then, the function SmoothProj(v) returns the locally reprojected position of vertex v, relative to its normal:

SmoothProj(v)
Let $\Delta V$ be the smoothing vector for vertex v.
Let $N_V$ be the normal of v on the input geometrical primitive.
For each vertex $v_2$ in $A_V$:
 Let $v_3$ be the vertex of $A_V$ that is next to $v_2$.
 Let k be any scalar number.
 If the line defined by the equation $S_V + k * N_V$ intersects the triangle defined by the triplet of original positions of v, $v_2$, and $v_3$, then:
  Return the intersection position between the triangle and the line.
Intersections should usually be found. If it is not the case, simply return the smoothed position of v.

Another form of restriction is to limit smoothing based on curvature type. The smoothing is applied proportionally to the concavity or convexity of the surface, which is determined by the surface normal. This restriction can be used to avoid a so-called "elbow pinching" effect and to create skin tension or cloth effects.

A method for computing restriction related to concavities or convexities will now be described. Some geometrical primitives may provide implicit information about their concavities and convexities. The following method, however, is based only on the local neighborhood of a vertex. Assuming that vertex v is connected to n adjacent vertices contained in set $A_V$, then the function RestrictConcave(v) and RestrictConvex(v) return the smoothed position of vertex v restricted, respectively, by local concavity and convexity:

RestrictConcave (v)
Let $P_V$ be the position of v on the original geometrical primitive.
Let $N_V$ be the normalized normal of v on the input geometrical primitive ($\|Nv\|=1$).
Let $\Delta V$ be the smoothing vector for vertex v.
Scalar c=0, s=0.
For each vertex $v_2$ in $A_V$:
 Let $P_{V2}$ be the position of $v_2$ on the original geometrical primitive.
 Vector $\Delta v_2 = (P_{V2} - P_V)/\|(P_{V2} - P_V)\|$
 $c = c + \Delta v_2 \cdot N_V$
 $s = s + 1$
$c = \max(0, c/s)$
Return $c * \Delta V + P_V$ RestrictConvex (v) is the same as for RestrictConcave (v), but the inverse of the vertex normal is used (−Nv instead of Nv).

There are other ways to restrict the smooth vector relative to the degree of local concavity or convexity. One of these is to weight the neighbor contribution with the same weighting as in the smooth operator, in which case:

$c = c + \Delta v_2 \cdot N_V$ becomes "$c = c + \text{weight}(n\text{dist}(v, v_2)) * (\Delta v_2 \cdot N_v)$"; and $c = c + \Delta v_2 \cdot N_V$ becomes "$s = s + \text{weight}(n\text{dist}(v, v_2))$".

In both cases, the concavity or convexity could be restricted at each neighbor, individually by the following:

$c = c + \Delta v_2 \cdot N_V$ becomes "$c = c + \text{weight}(n\text{dist}(v, v_2)) * \max(0, (\Delta v_2 \cdot N_v))$".

Another form of restriction is to limit smoothing based on normal direction type. A vertex can be restricted to movement either parallel to or perpendicular to the surface normal. Restricting movement of a vertex to a direction that is parallel to the normal removes height noise in a surface without affecting alignment of lines on that surface. Restricting movement of a vertex to a direction that is perpendicular to the normal has the inverse effect. In particular, surface alignment is smoothed but heights of vertices are retained.

The following describes how to compute the restricted smoothing vector $\Delta V'$ of vertex v relatively to its smoothing vector $\Delta V$ and its normalized normal Nv ($\|Nv\|=1$):
Perpendicular restriction: $\Delta V' = \Delta V - (\Delta V \cdot Nv) * Nv$
Perpendicular restriction: $\Delta V' = (\Delta V \cdot Nv) * Nv$ The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. A computer-implemented method for restricting a smoothing operation on a three-dimensional geometric primitive for modeling characters in three-dimensional animation defined by a plurality of control points, comprising:
    computing a set of vectors describing how each control point moves as a result of applying a smoothing operation;
    filtering the set of vectors to apply a user-selected restriction to the set of vectors, wherein the user-selected restriction limits the set of vectors according to a normal of a surface corresponding to the three-dimensional geometric primitive; and
    applying the filtered set of vectors to the control points to smooth the three-dimensional geometric primitive;
    wherein the set of vectors are filtered so as to reproject a control point onto the surface corresponding to the three-dimensional geometrical primitive along a normal of a surface defined by the smoothed three-dimensional geometrical primitive.

2. The computer-implemented method of claim 1, wherein the reprojection is localized.

3. A computer-implemented method for restricting a smoothing operation on a three-dimensional geometric primitive for modeling characters in three-dimensional animation defined by a plurality of control points, comprising:
    computing a set of vectors describing how each control point moves as a result of applying a smoothing operation;
    filtering the set of vectors to apply a user-selected restriction to the set of vectors, wherein the user-selected restriction limits the set of vectors according to a normal of a surface corresponding to the three-dimensional geometric primitive; and
    applying the filtered set of vectors to the control points to smooth the three-dimensional geometric primitive;
    wherein the set of vectors are filtered so as to reproject a control point onto the surface corresponding to the three-dimensional geometrical primitive along a normal of a surface defined by the original three-dimensional geometrical primitive.

4. The computer-implemented method of claim 3, wherein the reprojection is localized.

5. A computer program product, comprising:
    a computer-readable medium;
    computer program instructions stored on the computer readable medium which, when processed by a computer, instruct the computer to implement a method for restricting a smoothing operation on a three-dimensional geometric primitive for modeling characters in three-dimensional animation defined by a plurality of control points, comprising:
        computing a set of vectors describing how each control point moves as a result of applying a smoothing operation;
        filtering the set of vectors to apply a user-selected restriction to the set of vectors, wherein the user-selected restriction limits the set of vectors according to a normal of a surface corresponding to the three-dimensional geometric primitive; and
        applying the filtered set of vectors to the control points to smooth the three-dimensional geometric primitive;
        wherein the set of vectors are filtered so as to reproject a control point onto the surface corresponding to the three-dimensional geometrical primitive along a normal of a surface defined by the smoothed three-dimensional geometrical primitive.

6. The computer program product of claim 5, wherein the reprojection is localized.

7. A computer program product, comprising:

a computer-readable medium;

computer program instructions stored on the computer readable medium which, when processed by a computer, instruct the computer to implement a method for restricting a smoothing operation on a three-dimensional geometric primitive for modeling characters in three-dimensional animation defined by a plurality of control points, comprising:

computing a set of vectors describing how each control point moves as a result of applying a smoothing operation;

filtering the set of vectors to apply a user-selected restriction to the set of vectors, wherein the user-selected restriction limits the set of vectors according to a normal of a surface corresponding to the three-dimensional geometric primitive; and applying the filtered set of vectors to the control points to smooth the three-dimensional geometric primitive;

wherein the set of vectors are filtered so as to reproject a control point onto the surface corresponding to the three-dimensional geometrical primitive along a normal of a surface defined by the original three-dimensional geometrical primitive.

8. The computer program product of claim 7, wherein the reprojection is localized.

* * * * *